United States Patent
Yu et al.

(10) Patent No.: US 7,426,163 B2
(45) Date of Patent: Sep. 16, 2008

(54) METHOD AND APPARATUS FOR PREVENTING MALFUNCTION OF DISC DRIVE

(75) Inventors: Jin-woo Yu, Gyeonggi-do (KR); Young-ki Byun, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 1028 days.

(21) Appl. No.: 10/677,330

(22) Filed: Oct. 3, 2003

(65) Prior Publication Data
US 2004/0076095 A1    Apr. 22, 2004

(30) Foreign Application Priority Data
Oct. 15, 2002    (KR) .................. 10-2002-0062697

(51) Int. Cl.
G11B 7/00    (2006.01)
(52) U.S. Cl. .............. 369/53.18; 369/53.42; 369/44.32; 369/59.1
(58) Field of Classification Search .............. None
See application file for complete search history.

(56) References Cited

U.S. PATENT DOCUMENTS 6,043,946 A * 3/2000 Genheimer et al. .......... 360/53

2002/0034143 A1 * 3/2002 Kaneshige et al. ....... 369/59.18

FOREIGN PATENT DOCUMENTS

JP    10-334619    12/1998
KR    1999-0051455    7/1999

* cited by examiner

Primary Examiner—Thang V. Tran
Assistant Examiner—Lixi Chow
(74) Attorney, Agent, or Firm—Staas & Halsey LLP

(57) ABSTRACT

A method and apparatus for preventing a malfunction of a disc drive due to an operation error of a correction function for a minimum pit length by selectively performing the correction function based on an operative state of the disc drive. The method includes a first monitoring operation determining whether an operative state of the disc drive is stable when a disc is loaded into the disc drive, controlling a turning on of a correction function for a minimum pit length if the operative state of the disc drive is stable, and a second monitoring operation determining whether the operative state of the disc drive is stable after turning the correction function for the minimum pit length on and turning the correction function off if the operative state of the disc drive is determined to be unstable based on the second monitoring result.

16 Claims, 2 Drawing Sheets

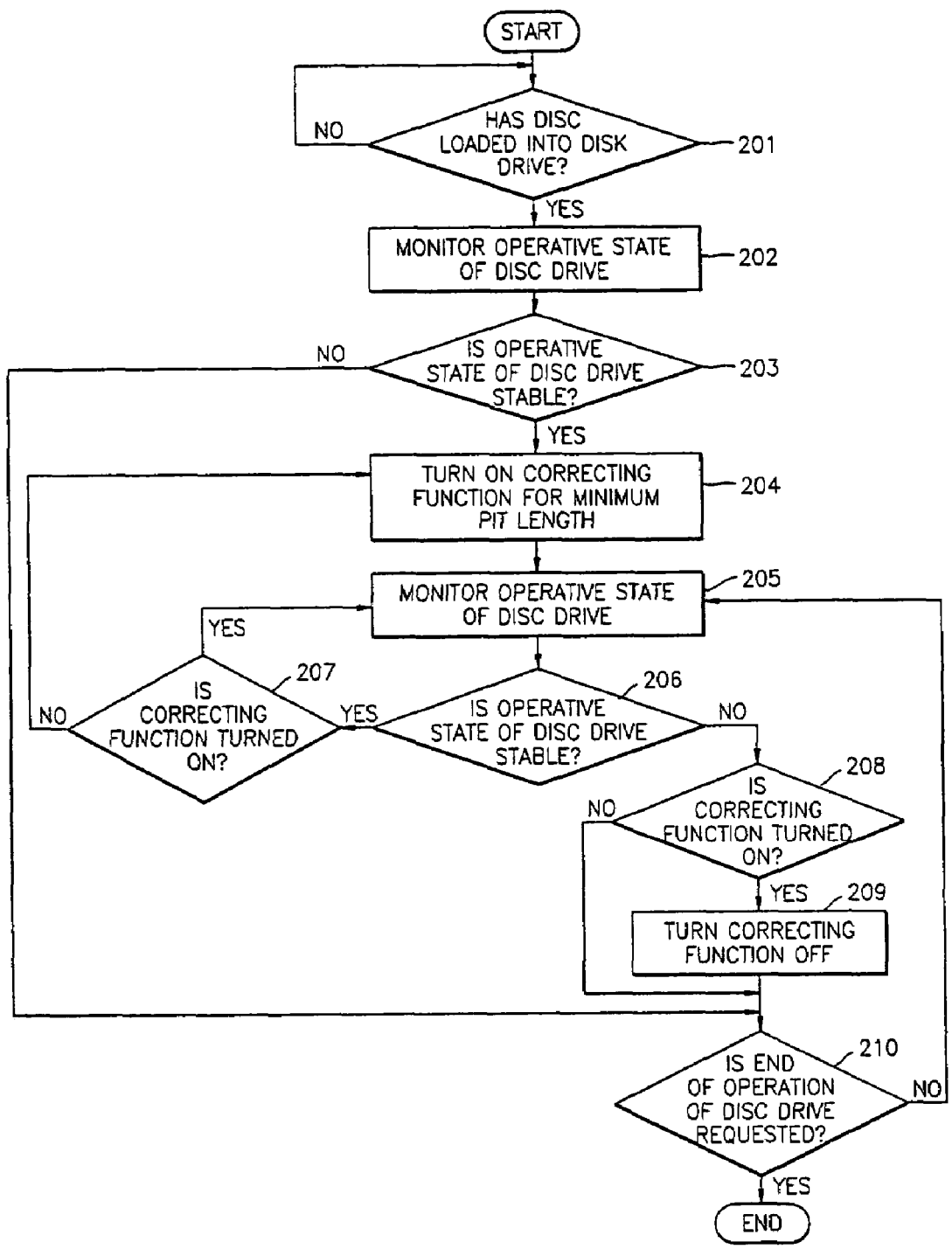

METHOD AND APPARATUS FOR PREVENTING MALFUNCTION OF DISC DRIVE

CROSS-REFERENCE TO RELATED APPLICATION

This application claims the benefit of Korean Patent Application No. 2002-62697, filed on Oct. 15, 2002, in the Korean Intellectual Property Office, the disclosure of which is incorporated herein by reference.

BACKGROUND OF THE INVENTION

1. Field of the Invention

The present invention relates to a method and apparatus for preventing a malfunction of a disc drive, and more particularly, to a method and apparatus for preventing a malfunction of a disc drive due to performing a correction function for a minimum pit length when the disc drive is in an unstable operative state.

2. Description of the Related Art

As the operation speeds of optical disc drives continue to increase, radio frequency (RF) signals more frequently deteriorate due to the limitation of the speed of optical pickups for reading a disc. In particular, a minimum pit length signal having the highest frequency is easily deteriorated. If reproduction signals of the RF signals such as the minimum pit length signal are deteriorated, the reproduction quality of a disc drive is reduced. The minimum pit length can be set to 3T. Here, T represents a period of one bit clock.

A conventional disc drive has a correction function for a minimum pit length employing a level or a phase of an RF signal reproduced from the disc drive. Thus, if the reproduced RF signal is abnormal due to the unstable operation of the disc drive, an abnormal correction result for the minimum pit length is obtained. For example, if the operative state of the disc drive is unstable due to an external impact, an electric shock, a stop operation of the disc drive, and an error of a focus lock operation, etc., the reproduced RF signal may be abnormal. If the reproduced RF signal is abnormal, an error may be generated in a correction result for the minimum pit length with respect to the reproduced RF signal, or a malfunction of the disc drive may occur due to the abnormally performed correction function.

For example, if the reproduced RF signal is not synchronized due to a physical impact, the correction function for the minimum pit length is not performed correctly and the disc drive malfunctions. Further, if the RF signal is generated by mistakenly recognizing a speck on the disc as a minimum pit length signal, an error is generated in a correction result for the erroneous minimum pit length so that an error correction operation performed in a digital signal processing unit included in the disc drive is abnormally performed and the disc drive malfunctions.

If a disc is loaded into a disc drive having the capability to perform the correction function, however, the correction function is turned on irrespective of the operative state of the disc drive. Thus, a malfunction of the disc drive may occur due to the above-described problems.

SUMMARY OF THE INVENTION

The present invention provides a method and apparatus preventing a malfunction of a disc drive due to an operation error of a correction function for a minimum pit length by selectively performing the correction function based on an operative state of the disc drive.

According to an aspect of the present invention, a method is provided preventing a malfunction of a disc drive. The method comprises a first monitoring operation determining whether an operative state of the disc drive is stable when a disc is loaded into the disc drive, and controlling a turning on of a correction function for a minimum pit length, if the operative state of the disc drive is stable.

The method further comprises a second monitoring operation determining whether the operative state of the disc drive is stable after turning the correction function on, and controlling a turning off of the correction function, if the operative state of the disc drive is determined to be unstable from the second monitoring result.

According to an aspect of the invention, the first monitoring and the second monitoring operations monitor overall functions of the disc drive.

According to an aspect of the present invention, a malfunction preventing apparatus of a disc drive is provided comprising a digital signal processing unit having a correction function correcting a signal for a minimum pit length using a RF signal generated according to an operation of the disc drive. A system control unit monitors the operative state of the disc drive and controls the turning on of the correction function if the operative state of the disc drive is stable.

According to an aspect of the present invention, the system control unit continuously monitors the operative state of the disc drive after turning the correction function on and turning the correction function off if the operative state of the disc drive is determined to be unstable. The system control unit monitors overall functions of the disc drive for determining an unstable operative state of the disc drive.

Additional aspects and advantages of the invention will be set forth in part in the description which follows and, in part, will be obvious from the description, or may be learned by practice of the invention.

BRIEF DESCRIPTION OF THE DRAWINGS

These features and/or other aspects and advantages of the invention will become apparent and more readily appreciated from the following description of the embodiments taken in conjunction with accompanying drawings in which:

FIG. 2 is a flowchart of a method of preventing a malfunction of a disc drive according to an aspect of the present invention.

DETAILED DESCRIPTION OF THE INVENTION

Figure 1:
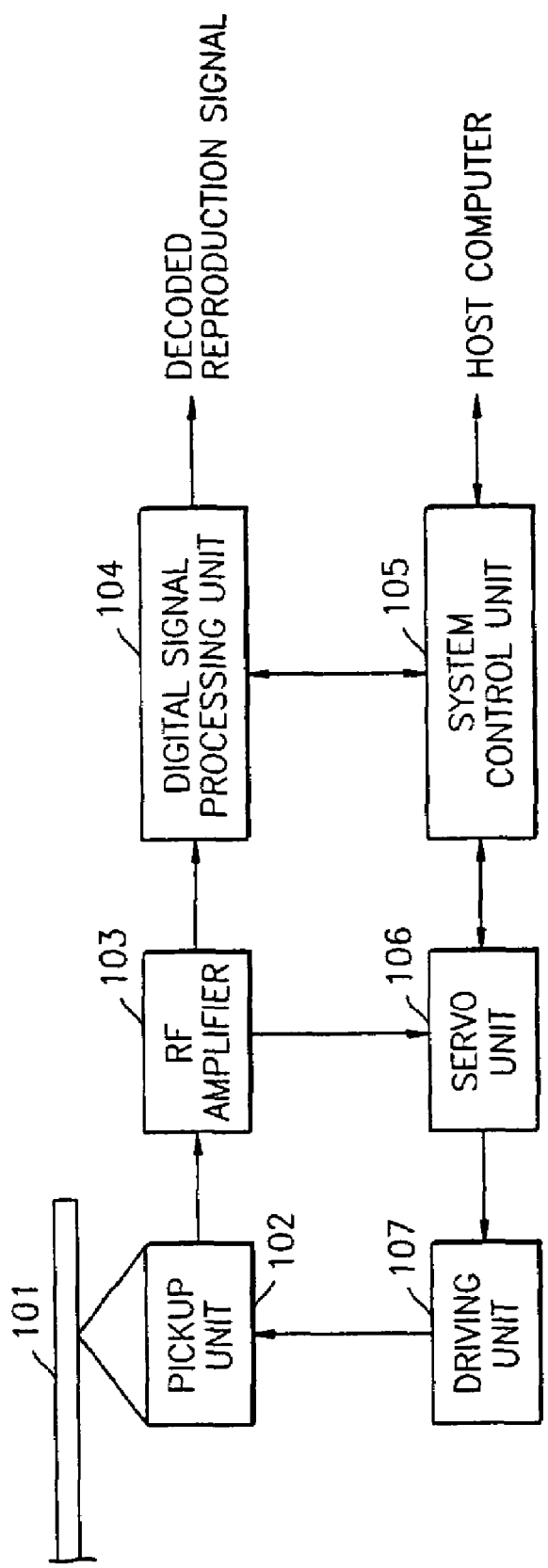
FIG. 1 is a block diagram of a disc drive having a malfunction preventing apparatus according to an aspect of the present invention.

Reference will now be made in detail to the embodiments of the present invention, examples of which are illustrated in the accompanying drawings wherein like reference numerals refer to the like elements throughout. The embodiments are described below in order to explain the present invention by referring to the figures.

As shown in FIG. 1, a disc drive having a malfunction preventing apparatus includes a disc 101, a pickup unit 102, a radio frequency (RF) amplifier 103, a digital signal processing unit 104, a system control unit 105, a servo unit 106, and a driving unit 107. The disc 101 is an optical medium such as a compact disc (CD) or a digital versatile disc (DVD). The disc 101 may be a readable disc and/or a writable disc.

When the disc drive is driven, the pickup unit 102 converts a signal optically picked up from the disc 101 into an electric signal, that is, an RF signal, and outputs the signal. The RF amplifier 103 amplifies the RF signal received from the pickup unit 102 by a predetermined value and outputs the amplified RF signal.

The digital signal processing unit 104 performs a correction operation for a minimum pit length, a detection operation of a synchronization signal, and a decoding operation based on the RF signal sent from the RF amplifier 103. The minimum pit length is determined according to the disc type. For example, the minimum pit length can be 3T. If the minimum pit length of the disc 101 is 3T, the correction operation is a 3T-correcting operation.

The system control unit 105 controls overall functions of the disc drive. In particular, the system control unit 105 determines whether the operative state of the disc drive is stable, while monitoring the synchronization signal supplied from the digital signal processing unit 104, the operation of the servo unit 106, and a signal supplied from a host computer (not shown).

The system control unit 105 determines that the operative state of the disc drive is unstable, for example, if the period of the synchronization signal supplied from the digital signal processing unit 104 is not regular, after the servo unit 106 is requested to turn on a focus lock operation or a constant linear velocity (CLV) lock operation, if a level of a response signal corresponding to the turn on operation of the focus lock or the CLV lock generated in the servo unit 106 does not meet a specified standard, and if the level or the phase of the RF signal reproduced when the host computer requests the disc drive to perform "STOP" operation during a normal reproduction operation is generated abnormally. The period of the synchronization signal may not be regular due to the occurrence of an external impact, an electric shock, or specks, dusts or scratches on the disc 101. The system control unit 105 can consider other cases capable of determining whether the operative state of the disc drive is stable in addition to the above-described cases.

If the operative state of the disc drive is determined to be stable from the monitoring result, the system control unit 105 controls the digital signal processing unit 104 so as to turn on the correction function for the minimum pit length. Thus, the digital signal processing unit 104 performs the correction function for the minimum pit length with respect to the RF signal received from the RF amplifier 103 and outputs a reproduction signal decoding the RF signal for which the correction function is performed.

However, if the operative state of the disc drive is determined to be unstable from the monitoring result, the system control unit 105 controls the digital signal processing unit 104 to turn off the correction function for the minimum pit length.

The monitoring operation, to turn the correction function on or off, is continuously performed from the beginning to the end of the operation of the disc drive. Thus, if the operative state of the disc drive is determined to be unstable even in a normal reproduction mode while performing the correction function, the system control unit 105 turns the correction function off.

The servo unit 106 controls the driving unit 107 by a control signal supplied from the system control unit 105 and a tracking error signal and a focusing error signal supplied from the RF amplifier 103, as in the related art, and drives the pickup unit 102.

FIG. 2 is a flowchart of a method of preventing a malfunction of a disc drive according to an aspect of the present invention.

If a disc 101 is determined to be loaded into the disc drive in operation 201, then the system control unit 105 monitors the operative state of the disc drive in operation 202. That is, as in the FIG. 1 description, the system control unit 105 monitors the overall operative state of the disc drive, determining whether the operative state of the disc drive is stable.

If the operative state of the disc drive is determined to be stable in operation 203, the correction function for the minimum pit length is turned on in operation 204. Thereafter, the operative state of the disc drive is continuously monitored in operation 205. The monitoring operation performed in operation 205 is the same as that performed in operation 202.

If the operative state of the disc drive is determined to be stable in operation 206, whether the correction function is turned on is checked in operation 207. If the correction function is determined to be turned on in operation 207, the method returns to operation 205 and the monitoring operation is continuously performed. However, in operation 207, if the correction function is determined not to be turned on, the correction function is turned on (operation 204).

If the operative state of the disc drive is determined to be unstable from the monitoring result in operation 206, whether the correction function is turned on is checked in operation 208. If the correction function is determined to be turned on in operation 208, the correction function is controlled to be turned off in operation 209. If the correction function is not turned on in operation 208, that is, the correction function is turned off, the method goes to operation 210.

Next, in operation 210, whether an end of the operation of the disc drive is requested is checked. If the end of the operation of the disc drive is not requested, the method returns to operation 205. However, if the end of the operation of the disc drive is requested, the operation of the disc drive is ended.

If the operative state of the disc drive is determined to be unstable from the monitoring result in operation 203, the method goes to operation 210.

The monitoring operation is continuously performed even when the disc drive operates in a state of a normal reproduction mode.

As described above, according to an aspect of the present invention, a malfunction of a disc drive due to a error of a correction function for a minimum pit length can be prevented by turning the correction function off in a case where the operative state of the disc drive is unstable, and turning the correction function on in a case where an operative state of the disc drive is stable.

According to other aspects of the invention, the system control unit 105 or other component is a computer implementing the method shown in FIG. 2 using data encoded on a computer readable medium.

Although a few embodiments of the present invention have been particularly shown and described, it will be appreciated by those skilled in the art that changes may be made therein in these embodiments without departing from the principles and of the present invention, the scope or which is defined in the claims and their equivalents.

What is claimed is:

1. A method of preventing a malfunction of a disc drive, comprising:
   a first monitoring operation determining whether an operative state of the disc drive is stable when a disc is loaded into the disc drive;
   determining if the operative state of the disc drive is stable;
   controlling a turning on of a correction function for a minimum pit length, if the operative state of the disc drive is determined to be stable;

a second monitoring operation determining whether the operative state of the disc drive is stable after turning the correction function for the minimum pit length on;

determining if the operative state of the disc drive is unstable; and controlling a turning off of the correction function, if the operative state of the disc drive is determined to be unstable from a second monitoring result, wherein the determining if the disc drive is unstable comprises:

determining if a period of a synchronization signal supplied from a digital signal processing unit is not regular, determining if after a servo unit is requested to turn on a focus lock operation or a constant linear velocity lock operation, a level of a response signal corresponding to the turn on operation of the focus lock or the CLV lock generated in the servo unit does not meet a specified standard, and determining if the level or the phase of a RF signal reproduced when a host computer requests the disc drive to perform "STOP" operation during a normal reproduction operation is generated abnormally.

2. The method of claim 1, wherein the first monitoring and the second monitoring operations monitor overall functions of the disc drive.

3. The method of claim 1, wherein the minimum pit length is 3T.

4. The method of preventing a malfunction of a disc drive according to claim 1, wherein the first monitoring operation comprises:

monitoring the synchronization signal supplied from the digital signal processing unit, monitoring the operation of the servo unit, and monitoring a signal supplied from the host computer.

5. The method of preventing a malfunction of a disc drive according to claim 1, wherein the second monitoring operation comprises:

monitoring the synchronization signal supplied from the digital signal processing unit, monitoring the operation of the servo unit, and monitoring a signal supplied from the host computer.

6. A malfunction preventing apparatus of a disc drive, comprising:

a digital signal processing unit correcting a signal for a minimum pit length using a radio frequency (RF) signal generated according to an operative state of the disc drive; and a system control unit monitoring the operative state of the disc drive, and if the operative state of the disc drive is stable controlling a turning on of the correcting, wherein the system control unit continuously monitors the operative state of the disc drive after the correcting, determining if the operative state of the disc drive is unstable, and controlling a turning off of the correcting, if the operative state of the disc drive is determined to be unstable, and the determining if the operative state of the disc drive is unstable comprises:

determining if a period of a synchronization signal supplied from a digital signal processing unit is not regular, determining if after a servo unit is requested to turn on a focus lock operation or a constant linear velocity lock operation, a level of a response signal corresponding to the turn on operation of the focus lock or the CLV lock generated in a servo unit does not meet a specified standard, and determining if the level or the phase of the RF signal reproduced when a host computer requests the disc drive to perform "STOP" operation during a normal reproduction operation is generated abnormally.

7. The malfunction preventing apparatus of claim 6, wherein the system control unit monitors overall functions of the disc drive for the determining if the operative state of the disc drive is unstable.

8. The malfunction preventing apparatus of claim 6, wherein the minimum pit length is 3T.

9. The malfunction preventing apparatus of a disc drive according to claim 6, wherein the monitoring of the operative state of the disc drive comprises:

monitoring the synchronization signal supplied from the digital signal processing unit, monitoring the operation of the servo unit, and monitoring a signal supplied from the host computer.

10. A method of preventing a malfunction of a disc drive, comprising:

monitoring an operative state of a disc drive;

determining a stability of the operative state of the disc drive; and controlling a turning on and a turning off of a correcting of a minimum pit length based on the determined stability, wherein the determining the stability of the disc drive unstable comprises determining if a period of a synchronization signal supplied from a digital signal processing unit is regular, determining if after a servo unit is requested to turn on a focus lock operation or a constant linear velocity lock operation, a level of a response signal corresponding to the turn on operation of the focus lock or the CLV lock generated in a servo unit meets a specified standard, and determining if the level or the phase of a RF signal reproduced when a host computer requests the disc drive to perform "STOP" operation during a normal reproduction operation is generated abnormally.

11. The method of preventing a malfunction of a disc drive, according to claim 10 wherein the monitoring an operative state of the disc drive comprises:

monitoring the synchronization signal supplied from the digital signal processing unit, monitoring the operation of the servo unit, and monitoring a signal supplied from the host computer.

12. The method of preventing a malfunction of a disc drive according to claim 10, wherein the monitoring is continuous.

13. A malfunction preventing apparatus of a disc drive, comprising:

a digital signal processing unit correcting a signal for a minimum pit length using a radio frequency (RF) signal generated according to an operative state of the disc drive; and a system control unit monitoring the operative state of the disc drive, and controlling the correcting of the minimum pit length based on the operative state of the disc drive, wherein the operative state of the disc drive comprises a regularity of a period of a synchronization signal supplied from a digital signal processing unit, a meeting of a specified standard of a level of a response signal corresponding to the turn on operation of the focus lock or the CLV lock generated in a servo unit after the servo unit is requested to turn on a focus lock operation or a constant linear velocity lock operation does not meet a specified standard, and normality of generation of the level or the phase of the RF signal reproduced when a host computer requests the disc drive to perform "STOP" operation during a normal reproduction operation.

14. The malfunction preventing apparatus of a disc drive according to claim 13, wherein the monitoring of the operative state of the disc drive includes monitoring the synchronization signal supplied from the digital signal processing unit, monitoring the operation of the servo unit, and monitoring a signal supplied from the host computer.

15. The malfunction preventing apparatus of a disc drive according to claim 13, wherein the monitoring of the operative state is continuous.

16. A computer-readable medium encoded with processing instructions implementing the method of claim 1 on a computer.

* * * * *